United States Patent
Wada et al.

(10) Patent No.: US 10,189,526 B2
(45) Date of Patent: Jan. 29, 2019

(54) STRUCTURE FOR FRONT PART OF SADDLED VEHICLE

(71) Applicant: Kawasaki Jukogyo Kabushiki Kaisha, Kobe-shi, Hyogo (JP)

(72) Inventors: Hiroyuki Wada, Kobe (JP); Takeshi Kashihara, Rayong (TH)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 163 days.

(21) Appl. No.: 15/286,420

(22) Filed: Oct. 5, 2016

(65) Prior Publication Data

US 2017/0021887 A1    Jan. 26, 2017

Related U.S. Application Data

(63) Continuation of application No. PCT/JP2015/058162, filed on Mar. 19, 2015.

(30) Foreign Application Priority Data

Apr. 18, 2014 (JP) ................... 2014-086072

(51) Int. Cl.
*B62J 6/02* (2006.01)
*B62J 17/04* (2006.01)
(Continued)

(52) U.S. Cl.
CPC .............. *B62J 23/00* (2013.01); *B62J 6/02* (2013.01); *B62J 17/04* (2013.01); *B62J 99/00* (2013.01); *B62J 2099/0026* (2013.01)

(58) Field of Classification Search
CPC ..... B62J 23/00; B62J 6/02; B62J 17/04; B62J 99/00; B62J 2099/0026
(Continued)

(56) References Cited

U.S. PATENT DOCUMENTS 4,019,774 A * 4/1977 Tsukahara .............. B62K 19/46
                                                            296/78.1
6,709,042 B2   3/2004 Takemura et al.
(Continued)

FOREIGN PATENT DOCUMENTS

EP    1143286    10/2001
EP    1291274    3/2003
(Continued)

OTHER PUBLICATIONS

Extended and Supplementary Search Report dated Dec. 14, 2017 for Corresponding European Patent Application No. 15780262.0 with English Language Summary (10 pages).
(Continued)

*Primary Examiner* — Jason S Morrow
*Assistant Examiner* — E Turner Hicks

(57) ABSTRACT

A front structure for a saddle-riding vehicle includes a meter unit, a meter covering for covering at least an area forwardly of the meter unit, and a windshield disposed forwardly of the meter covering. When viewed from lateral side, the windshield is disposed having been rearwardly upwardly tilted. The windshield has a rear surface is of a curved shape in which a region from its opposite side end portions to an intermediate portion is bulged forwardly. The meter covering has a front wall so shaped as to have a forwardly protruding shape effective to divert sunlight, coming from rear and subsequently reflected from the windshield, away from the focal point of the reflected sunlight.

9 Claims, 8 Drawing Sheets

(51) Int. Cl.
*B62J 23/00* (2006.01)
*B62J 99/00* (2009.01)

(58) Field of Classification Search
USPC .......................................... 296/78.1, 70, 97.2
See application file for complete search history.

(56) References Cited

U.S. PATENT DOCUMENTS

| | | | |
|---|---|---|---|
| 6,724,538 | B2 | 4/2004 | Kushida et al. |
| 7,812,559 | B2 | 10/2010 | Tsuda |
| 9,039,258 | B2 | 5/2015 | Noguchi |
| 9,132,875 | B2 | 9/2015 | Kato |
| 2002/0126391 | A1* | 9/2002 | Kushida ............... B62J 17/04 359/630 |
| 2003/0062740 | A1 | 4/2003 | Takemura et al. |
| 2008/0236922 | A1* | 10/2008 | Tsuda ................... B60R 25/24 180/167 |
| 2013/0099521 | A1* | 4/2013 | Kato ..................... B62J 17/04 296/78.1 |
| 2013/0249239 | A1* | 9/2013 | Yokouchi ............. B62J 17/00 296/180.1 |
| 2014/0063826 | A1* | 3/2014 | Noguchi ............... B62J 6/02 362/476 |

FOREIGN PATENT DOCUMENTS

| | | |
|---|---|---|
| EP | 2703263 | 3/2014 |
| EP | 2703269 | 3/2014 |
| JP | 2004-284548 | 10/2004 |
| JP | 2008-247185 | 10/2008 |
| JP | 2009-214723 | 9/2009 |
| JP | 2013-091387 | 5/2013 |
| JP | 2015/058162 | 3/2015 |

OTHER PUBLICATIONS

Notification of Reason(s) for Rejection dated Oct. 24, 2017 for Corresponding Japanese Patent Application No. 2014-086072 with English Language Summary (4 pages).

"Caution about accidental fires caused by a concentration of sunlight due to an aluminum wheel with respect to an aluminum wheel such as a coated concave mirror", Japan, National Consumer Affairs Center of Japan, Nov. 6, 2008, pp. 1-11 (11 pages).

National Consumer Affairs Center of Japan, Department of Product Testing, Complaints Handling, "Accidental fires caused by a concentration of sunlight due to suction disk of a lightproof curtain for vehicle", Japan, National Consumer Affairs Center of Japan, Dec. 17, 2012, Internet, pp. 18 to 19, <URL: http://www.kokusen.go.jp/pdf_dl/wko/wko-201212.pdf> (2 pages).

Suzuki, Takeshi, "About source of fire", Report of National Research Institute of Fire and Disaster, Japan, National Research Institute of Fire and Disaster, Mar. 2014 No. 116. pp. 23-45 (24 pages).

Kitamura, Yoshitsugu, "Accidental fires caused by a concentration of sunlight", Fire Investigation Research Team for Fire Fighters, Japan, Jan. 2, 2011, Internet, <URL: http://www7a.biglobe.ne.jp/~fireschool2/d-A3-03-3.html> (11 pages).

International Search Report for PCT/JP2015/058162, filed Mar. 19, 2015 (2 pages).

English Language Translation of the International Preliminary Report on Patentability (dated Oct. 27, 2016) for PCT/JP2015/058162 (6 pages).

* cited by examiner

STRUCTURE FOR FRONT PART OF SADDLED VEHICLE

CROSS REFERENCE TO THE RELATED APPLICATION

This application is a continuation application, under 35 U.S.C § 111(a) of international patent application No. PCT/JP2015/058162, filed Mar. 19, 2015, which claims priority to Japanese patent application No. 2014-086072, filed Apr. 18, 2014, the entire disclosure of which is herein incorporated by reference as a part of this application.

BACKGROUND OF THE INVENTION

Field of the Invention

The present invention relates to a front structure for a saddled vehicle or saddle riding vehicle, which is equipped with a meter unit, a meter covering for covering an area forwardly of the meter unit and a windshield disposed forwardly of the meter covering.

Description of Related Art

In a saddle-riding vehicle such as, for example, a motorcycle, it has been known to use a windshield mounted on an upper portion of a vehicle body front portion. In this respect, see, for example, the patent document 1 listed below. The windshield referred to above functions as a wind blocking function to prevent the wind from impinging upon a rider. Also, a meter unit for displaying, for example, the speed and the rotational number and a meter covering for covering the meter unit are disposed rearwardly of the windshield.

PRIOR ART LITERATURE

Patent Document 1: JP Laid-open Patent Publication No. 2013-091387

The windshield referred to above is so designed and so configured in order to reduce the air resistance as to represent a curved shape having been upwardly rearwardly inclined, when viewed from lateral side, and also having been bulged forwardly from opposite side portions thereof towards an intermediate portion thereof to represent a curved shape when viewed from front. For this reason, particularly during the parking, sunlight from rear reflects upon a rear surface of the windshield and is subsequently focused upon the meter covering, thus bringing about adverse effects on the meter covering.

SUMMARY OF THE INVENTION

In view of the foregoing, it is an object the present invention to provide a front structure for a saddle-riding vehicle which is capable of suppressing the influence of the adverse effects which is brought about by the sunlight upon the meter covering.

In order to accomplish the foregoing object discussed above, the front structure for the saddle-riding vehicle herein provided in accordance with the present invention is a front structure including a meter unit a meter covering for covering at least an area forwardly of the meter unit, and a windshield disposed forwardly of the meter covering. In this front structure of the present invention, the windshield is disposed in a fashion inclined upwardly rearwardly when viewed from lateral side and has a rear surface thereof bulged forwardly from opposite side portions thereof towards an intermediate portion thereof in a lateral direction while depicting a curved shape, and the meter covering has a front wall being shaped to represent such a shape as to bulge forwardly to thereby allow the sunlight, coming from rear, to divert from the focal point of light reflected upon the windshield.

According to the above described construction, the front wall of the meter covering represents such a shape as to bulge forwardly so as to divert from the focal point of the reflected light from the windshield and, therefore, the reflected light will not be focused on the meter covering. Accordingly, it is possible to suppress the adverse effect which the reflected light from the windshield brings about on the meter covering.

In a preferred embodiment of the present invention, the meter covering referred to above may have an extension which extends from an upper end portion of the front wall in a direction rearwardly to thereby cover an area above the meter unit, and the extension referred to above, when viewed from lateral side, preferably has a rear end that is positioned rearwardly of a rear end of the windshield. According to this construction, the area above the meter unit is covered by the extension and, therefore, it is possible to avoid a ghost on the windshield which would be brought about when the sunlight reflects upon a meter display surface.

In another preferred embodiment of the present invention, the windshield referred to above is preferably fitted for sliding movement in a vertical direction. In this case, the windshield is preferably positioned upwardly of a front fairing having a headlamp mounted thereon and is preferably supported by a vehicle frame structure through a shield bracket that extends through the meter covering in the vertical direction, and the windshield is preferably slidable substantially parallel to a lower half portion of the front wall along the shield bracket. According to this construction, while the windshield slides in the vertical direction according to the build of a rider, the possibility of an adverse effect, which would be brought about by reflected light on the meter covering, can be suppressed since the front wall of the meter covering is so designed and so shaped as to depart from the focus point of the reflected right from the windshield regardless of the position of the windshield.

In a further preferred embodiment of the present invention, the front wall referred to above preferably has a forwardly protruding shape protruding forwardly from opposite side portions toward an intermediate portion, and the front wall includes a lower half portion from a lower end portion to an intermediate portion in the vertical direction and an upper half portion from the intermediate portion to an upper end portion, in which case the lower half portion preferably extends along the windshield while the upper half portion extends inclined rearwardly so as to allow the front wall to depart from the windshield. In this case, the upper half portion of the front wall preferably extends having been inclined at the angle of inclination β that is within the range of 25 to 35° relative to a horizontal surface. According to this construction, the forward sight through the windshield is not disturbed by a rear end portion of the meter covering.

In a still further preferred embodiment of the present invention, the meter covering may include an outer covering segment and an inner covering segment, the outer covering segment and the inner covering segment being connected with each other, in which case the meter unit is mounted on the inner covering segment whereas the front wall is formed in the outer covering segment. According to this construction, the meter covering of a large size can be easily formed.

In a yet further preferred embodiment of the present invention, the front structure for the saddle-riding vehicle may also include a front fairing having the headlamp mounted thereon and a side fairing disposed on each lateral side of the front fairing to cover a region from at least an outer side of a head pipe and an outer side forwardly of an engine, in which case the meter covering is fitted to the front fairing and the side fairing. According to this construction, the meter covering of the large size can be stably supported.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
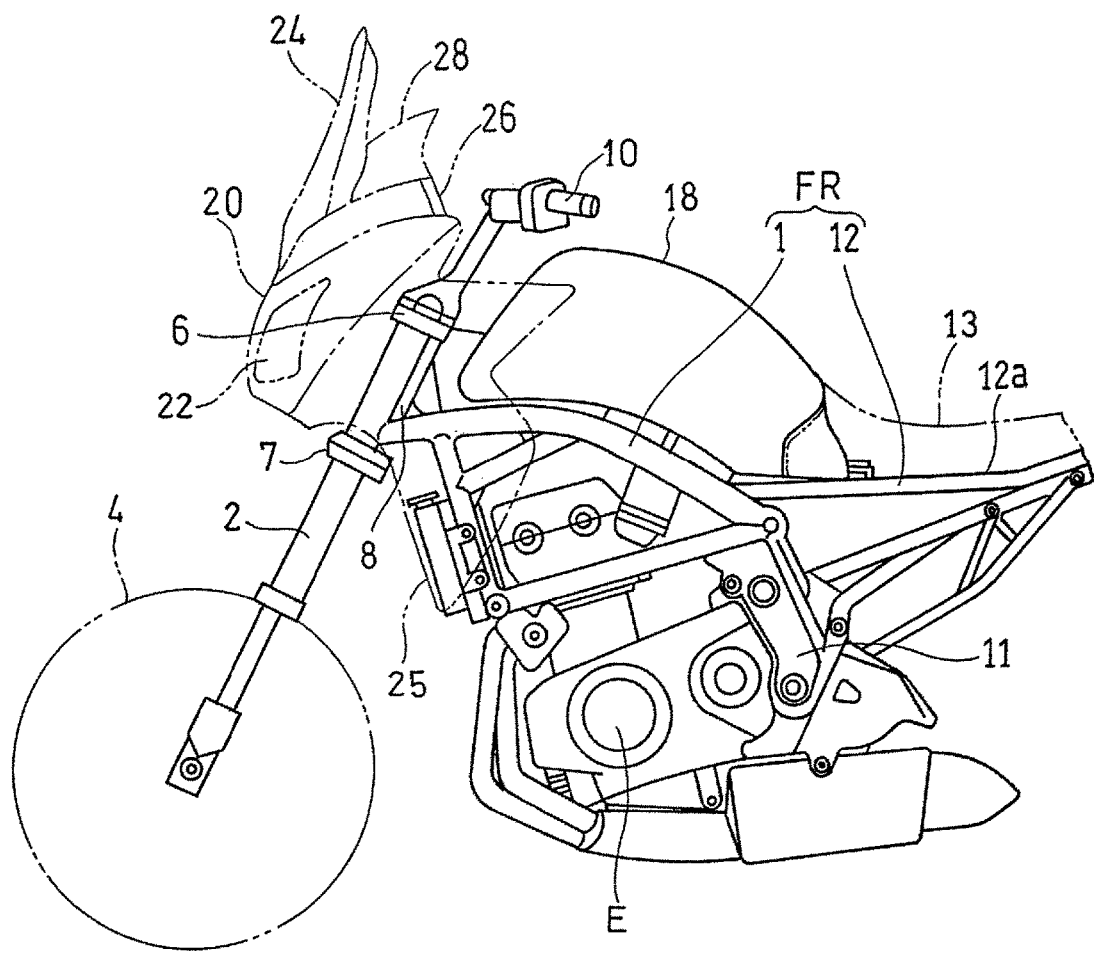
FIG. 1 is a side view showing a front portion of a motorcycle which is one kind of the saddle-riding vehicle equipped with a front structure designed in accordance with a preferred embodiment of the present invention.

Hereinafter a preferred embodiment of the present invention will be described in detail with reference to the accompanying drawings. In particular, it is to be noted that in describing the present invention, however, the terms "left" and "right" used hereinabove and hereinafter are relative terms descriptive of positions and/or direction as viewed from a rider maneuvering a motorcycle. Referring now to FIG. 1, the motorcycle to which the present invention is applied includes a main frame 1 forming a front half portion of a vehicle frame structure FR, and a front fork 2 is supported by a front end of the main frame 1 with a front wheel 4 supported at a lower end portion of such front fork 2. The front fork 2 referred to above is rotatably supported by a head pipe 8 at the front end of the main frame 1 together with an upper bracket 6 and a lower bracket 7 both supporting the front fork 2. A handlebar 10 is fitted to the upper bracket 6.

On the other hand, a swingarm bracket 11 is secured to a rear end lower portion of the main frame 1, and a swingarm (not shown) for supporting a rear wheel 8 is pivotally supported by the swingarm bracket 11. A combustion engine E for driving the rear wheel is supported by a lower intermediate portion of the main frame 1.

A rear frame 12 forming a rear half portion of the vehicle frame structure FR is connected with a rear portion of the main frame 1. A rider's seat 13 is supported on a seat rail 112*a* forming an upper portion of the rear frame 12. A fuel tank 18 is positioned on an upper portion of the main frame 1, that is, on a vehicle upper portion between the head pipe 8 and the rider's seat 13.

A front fairing 20, made of a resinous material, for covering an area forwardly of and adjacent to the head pipe 8 is mounted forwardly adjacent to the vehicle frame structure FR, and a headlamp 22 is mounted on this front fairing 20. A plate shaped windshield 24, made of a transparent resinous material, is disposed on an upper end portion of the front fairing 20. A meter unit 26 and a meter covering 28 are disposed rearwardly of the windshield 24.

Figure 8:
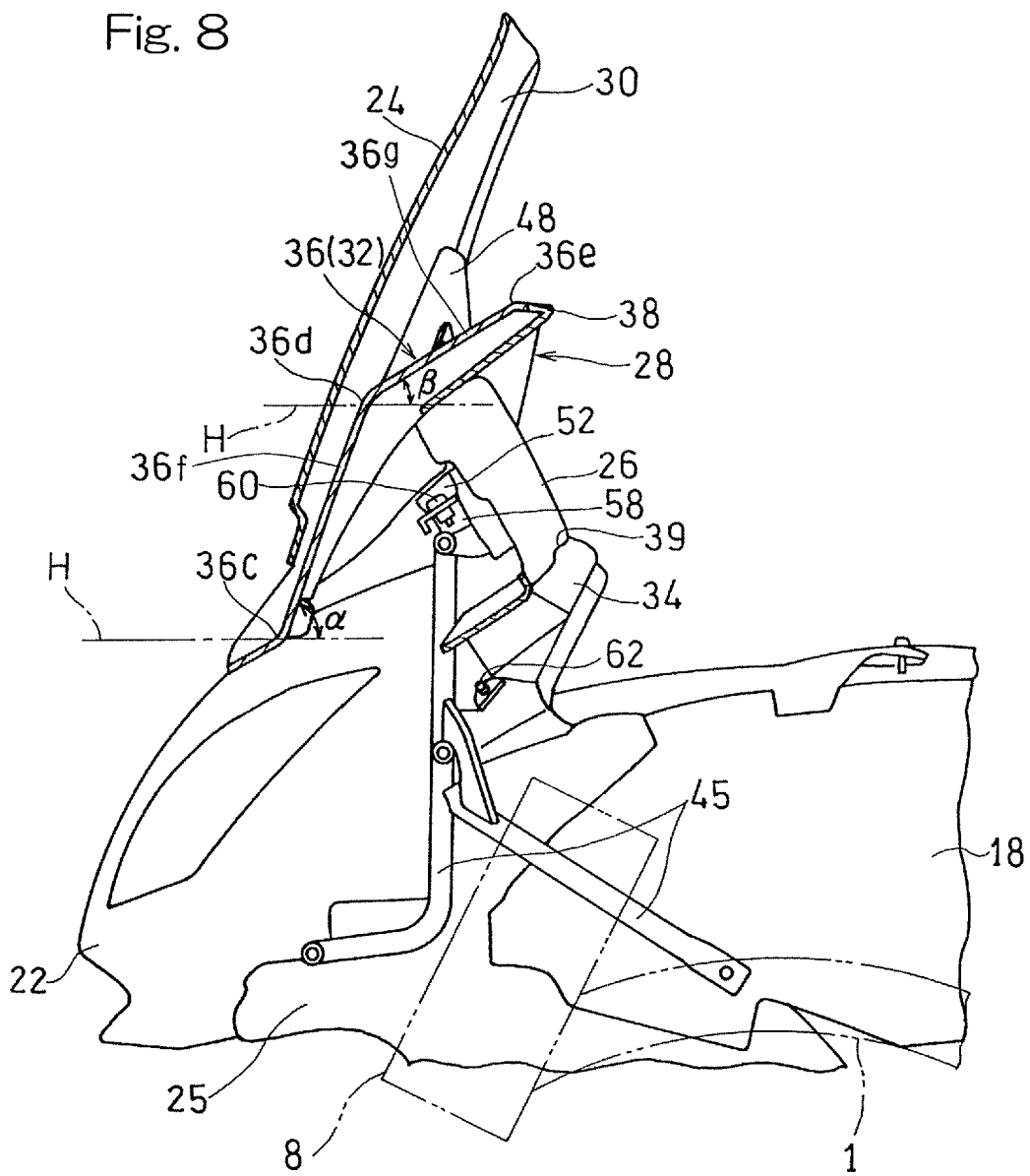
FIG. 8 is a longitudinal sectional view of FIG. 2.

The meter covering 28 is made of a resinous material and covers an area forwardly of, opposite lateral sides of and above the meter unit 26. The front fairing 20 has a pair of left and right side fairings 25 disposed on opposite sides of the front fairing 20 to thereby cover an area from lateral outer sides of the head pipe 8 to forwardly of the combustion engine E. The front fairing 20, the windshield 24 and the side fairings 25, all referred to above, are supported by the main frame 1 through cowl stays 45 (as best shown in FIG. 8).

Figure 2:
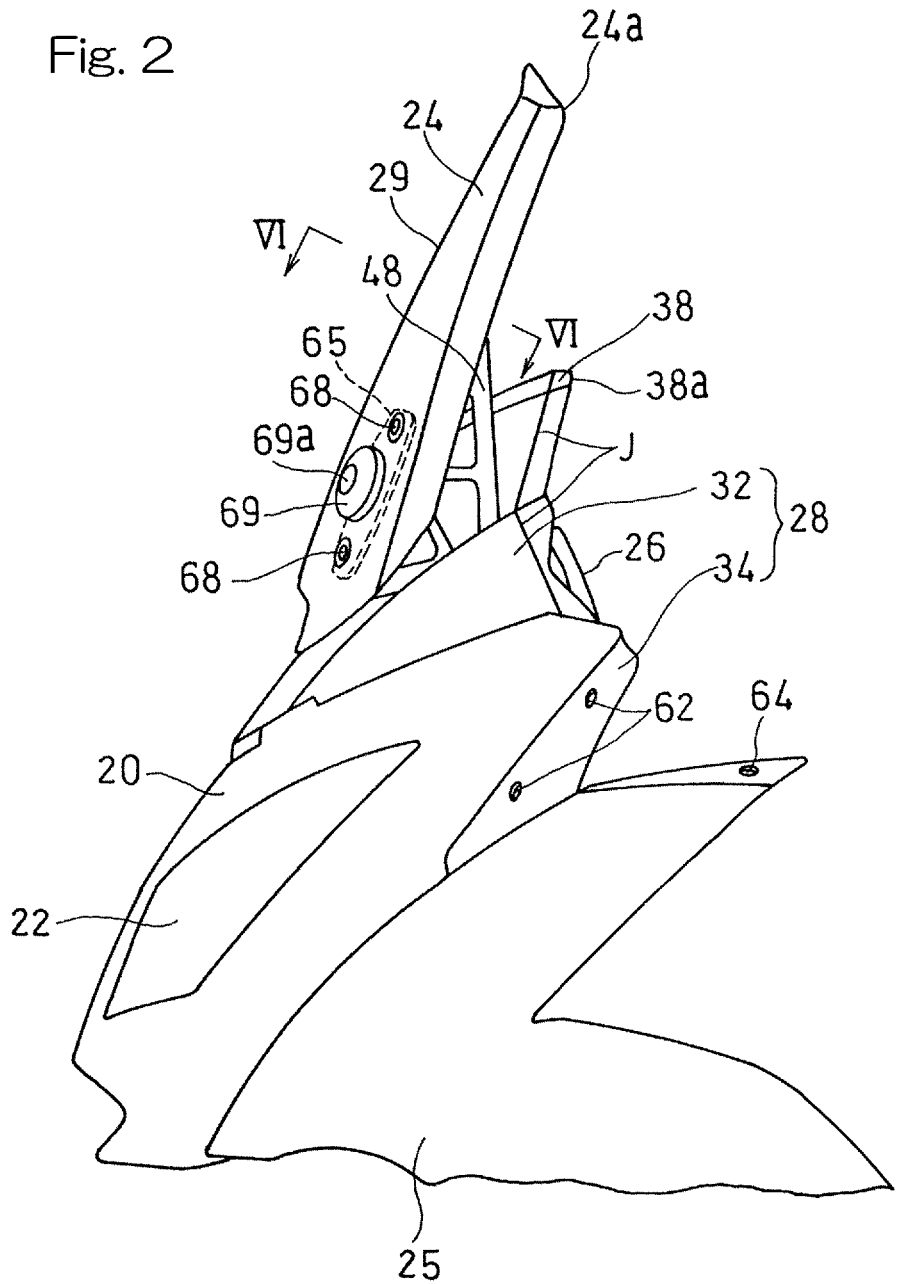
FIG. 2 is a side view showing, on an enlarged scale, an important portion of FIG. 1.

As shown in FIG. 2, the windshield 24 is slidably fitted to a vehicle body for adjustment in a vertical direction and is disposed in a fashion inclined upwardly rearwardly when viewed from lateral side. A slide structure for the windshield 24 will be described in detail later.

Figure 5:
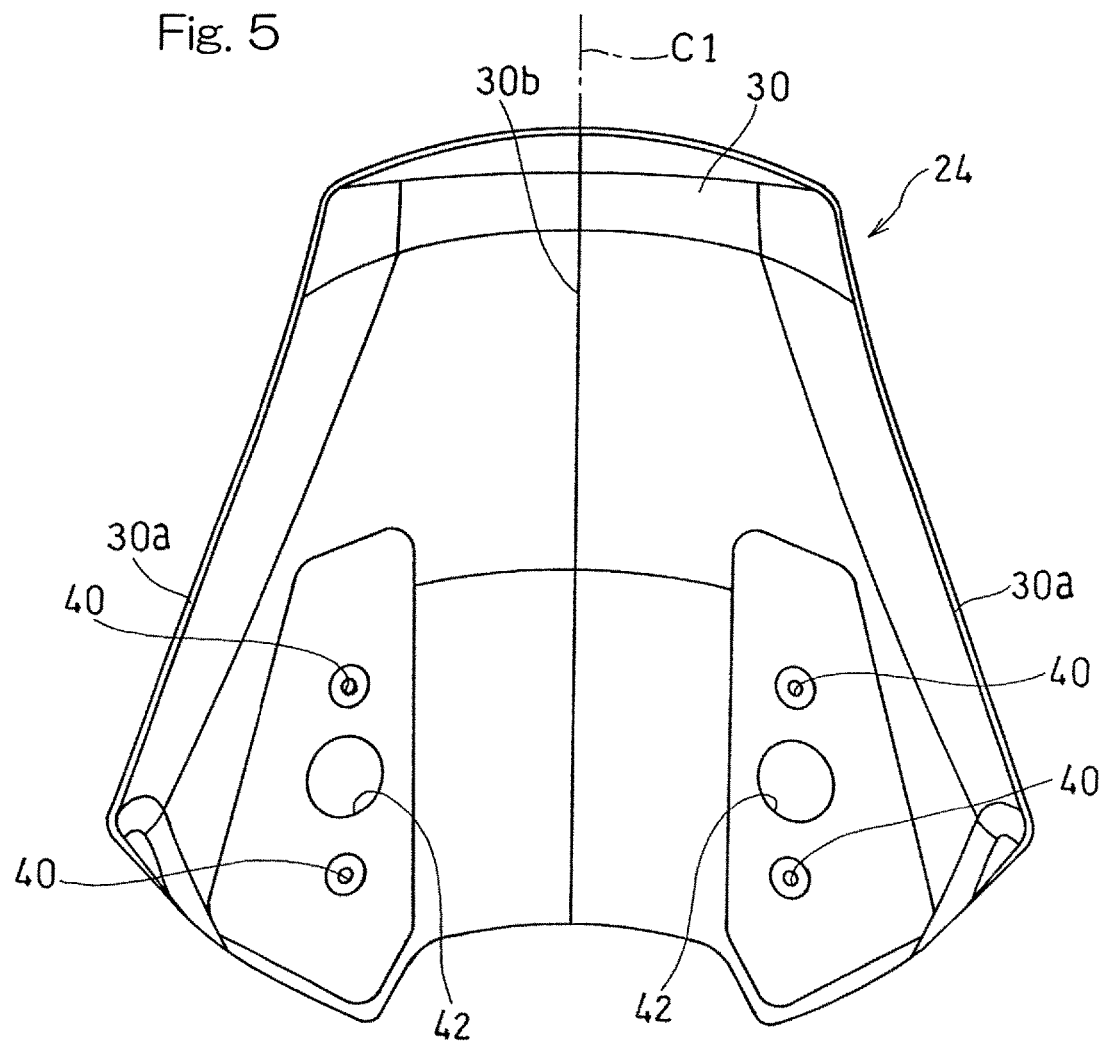
FIG. 5 is a rear view showing a windshield of the front structure.
Figure 6:
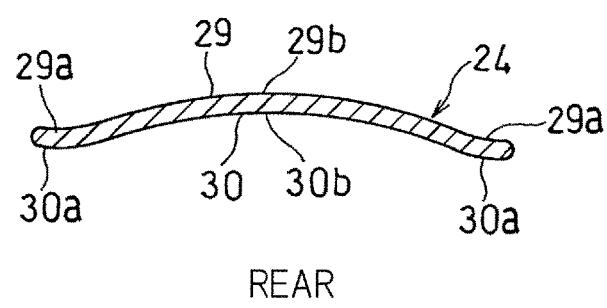
FIG. 6 is a cross sectional view taken along the line VI-VI in FIG. 2.

FIG. 5 is a rear view of the windshield 24. As shown in FIG. 5, the windshield 24 is of a bilaterally symmetrical shape with respect to a center line C1. FIG. 6 illustrates a section taken along the line VI-VI in FIG. 2, that is a transverse section perpendicular to a lateral or vehicle widthwise direction intermediate portion of a front surface 29 of the windshield 24 shown in FIG. 2. As shown in FIG. 6, the windshield 24 is of a plate shape while representing a forwardly curved shape with its front and rear surface 29 and 30 protruding forwardly respectively from left and right bilateral end portions 29*a* and 30*a* thereof towards an intermediate portion 29*b* and 30*b*. Bolt insertion holes 40 are formed in left and right bilateral side portions of a lower portion of the windshield 24 as shown in FIG. 5. Two rows of the bolt insertion holes 40 are employed in the instance now under discussion, each row including the two bolt insertion holes 40 juxtaposed in a vertical direction. An opening 42 in the form of a throughhole is formed between the bolt insertion holes 40 and 40 of each row in the vertical direction.

Figure 3:
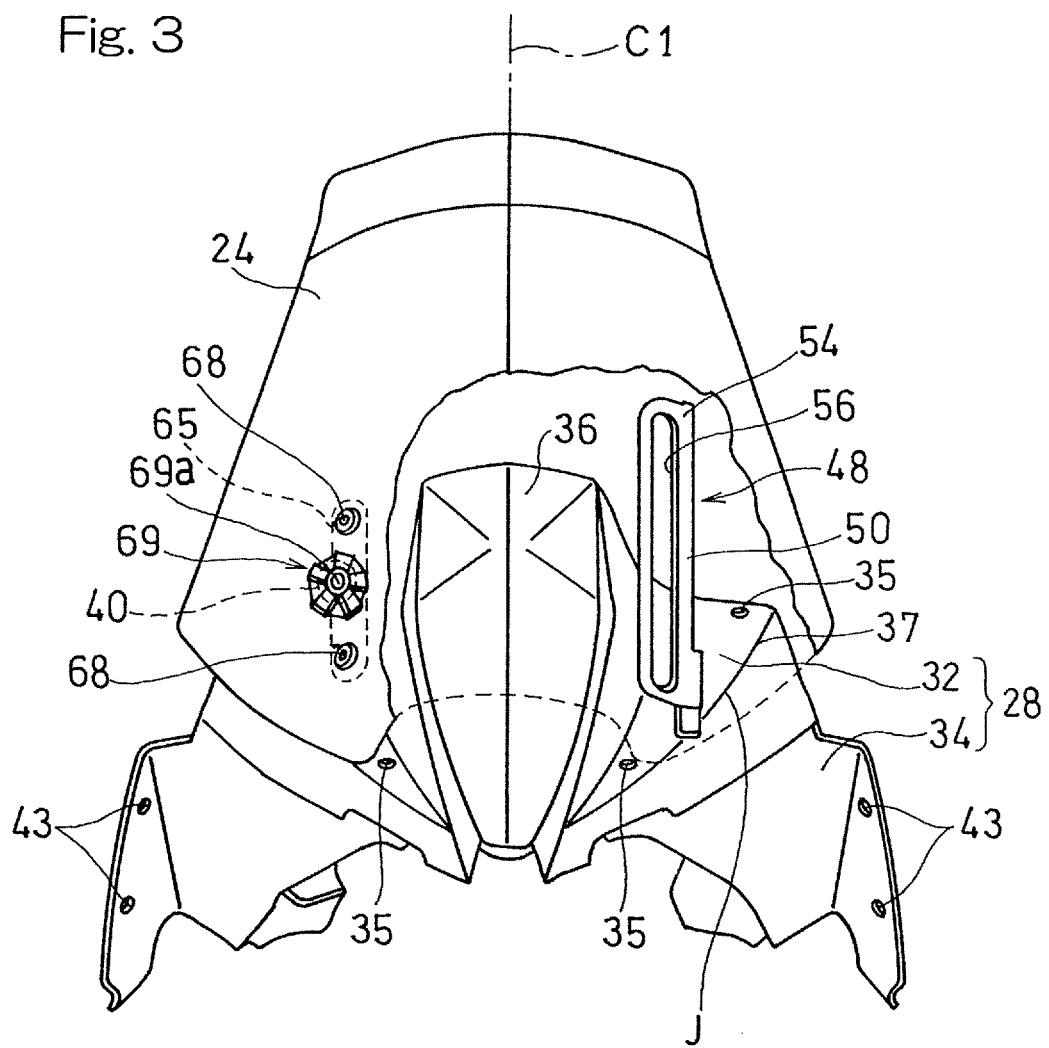
FIG. 3 is a front elevational view of the front structure.
Figure 4:
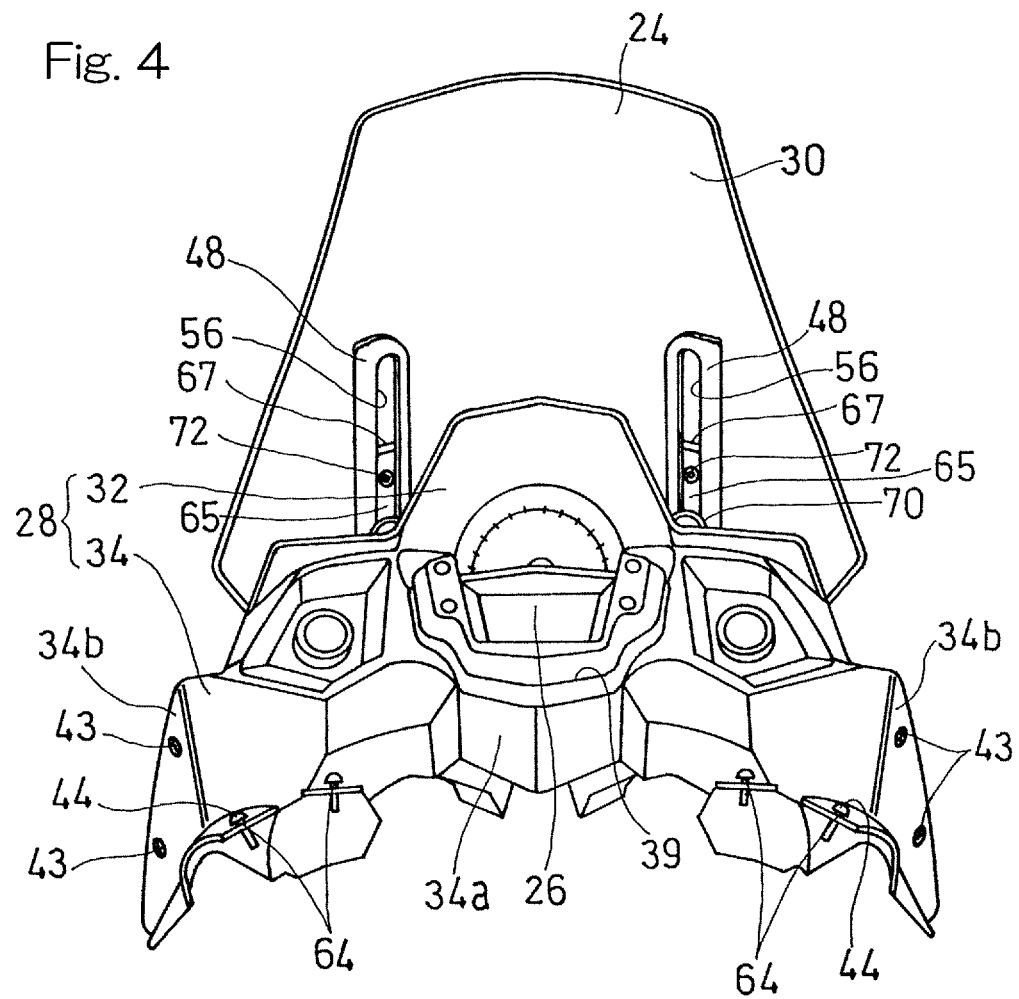
FIG. 4 is a rear view showing the front structure.

As shown in FIG. 4 showing a rear view of the front structure, the meter covering 28 includes an outer covering segment 32 and an inner covering segment 34, both of which are joined as at a joint face J (best shown in FIG. 2). As shown in FIG. 3 showing a front elevational view, those covering segments 32 and 34 are connected together by means of a plurality of fastening members 35 with the joint face J so defined.

The inner covering segment 34 shown in FIG. 4 includes a base portion 34a which is located intermediate in the vehicle widthwise direction, and left and right flanged portions 34b and 34b extending in left and right bilateral sides and adapted to be fitted to the front fairing 20 (shown in FIG. 2) and the side fairing 25. The flanged portions 34b and 34b form a portion of the fairing. A meter opening 39 is provided in the base portion 34a, and the meter unit 26 referred to previously is mounted in this meter opening 39. Bolt insertion holes 43, each oriented laterally outwardly in an upwardly inclined fashion, is formed in the left and right flanged portions 34b of the inner covering segment 34. The bolt insertion holes 43 are employed two in number while being lined up in a forward and rearward direction or longitudinal direction of the motorcycle. Also, rear end portions of the left and right flanged portions 34b in the inner covering segments 34 are formed with respective bolt insertion holes 44 that are oriented in the vertical direction. Those bolt insertion holes 44 are employed two in number while being lined up in the vehicle widthwise direction.

Figure 7:
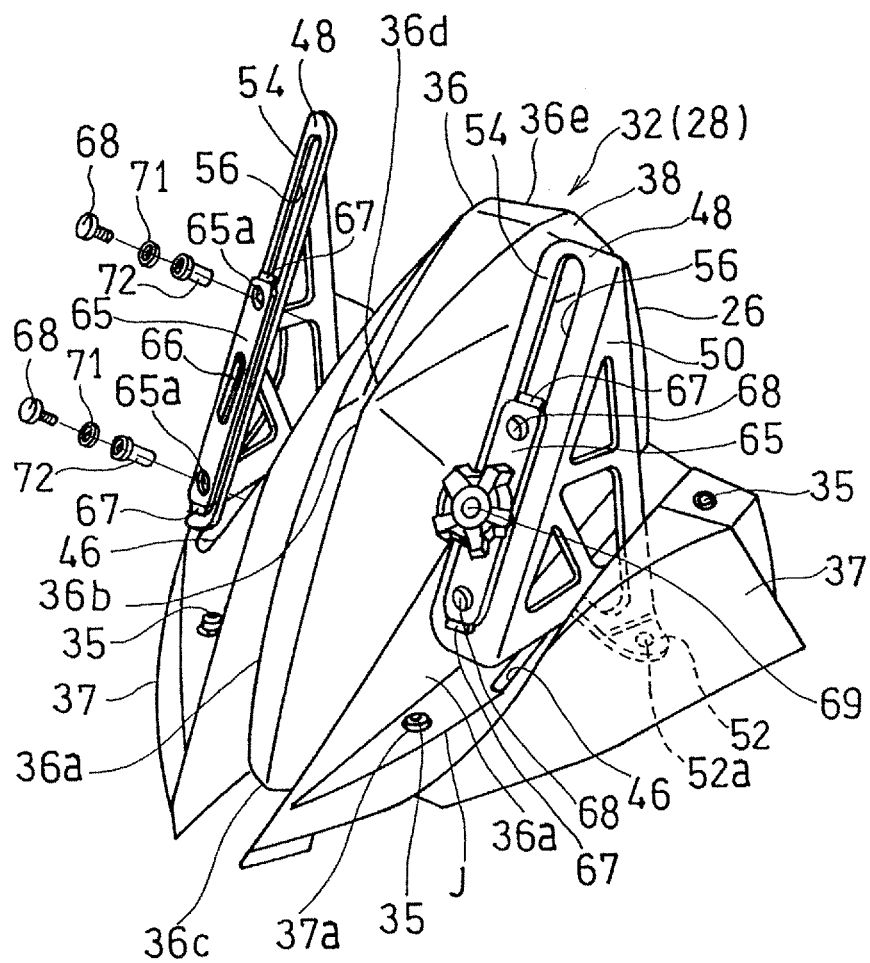
FIG. 7 is a perspective view showing an outer covering segment of a meter covering employed in the front structure.

FIG. 7 is a perspective view showing the outer covering segment 32 of the meter covering 28 as viewed from above in a forwardly downward direction. As shown in FIG. 7, the outer covering segment 32 includes a front wall 36 for covering forwardly of the meter unit 26 and left and right connections 37 on left and right sides of the front wall 36. The left and right connections 37 are provided with respective pluralities of bolt insertion holes 37a. The outer covering segment 32 and the inner covering segment 34 (shown in FIG. 4) are connected together when the previously described bolt 35 is inserted from above into each of the bolt insertion holes 37a and is then threaded into a corresponding threaded hole (not shown) in the inner covering segment 34 (shown in FIG. 4).

A bracket opening 46 is defined in the outer covering segment 32 between the front wall 36 and the left and right connections 37. The bracket opening 46 is in the form of a throughhole representing a slot elongated in the longitudinal direction. Shield brackets 48 for supporting the windshield 24 (shown in FIG. 2) extend through the respective left and right bracket openings 46. The front wall 36 of the outer covering segment 32 is of a protruding shape that is bulged forwardly. More specifically, the front wall 36 has a forwardly bulged protruding shape forwardly bulged from opposite side end portions 36a and 36a towards an intermediate portion 36b.

Also, as shown in the sectional view of FIG. 8, the front wall 36 includes a lower half portion 36f ranging from a lower end portion 36c to an intermediate portion 36 in the vertical direction and an upper half portion 36g ranging from the intermediate portion to an upper end portion 36e. The lower half portion 36f extends substantially parallel to a rear surface 30 of the windshield 24 in a direction diagonally upwardly and rearwardly at an angle of inclination α relative to the horizontal plane H, whereas the upper half portion 36g extends inclined diagonally upwardly and rearwardly at an angle of inclination β so as to diverge from the windshield 24. The angle of inclination α referred to above is preferably so chosen as to be within the range of 65 to 75°, and in the practice of the preferred embodiment now under discussion about 70° is chosen therefor. On the other hand, the angle of inclination β referred to above is preferably so chosen as to be within the range of 25 to 35°, and in the practice of the preferred embodiment now under discussion, about 30° is chosen therefor.

As shown in FIG. 2, the inner covering segment 34 of the meter covering 28 is formed with an extension 38 which extends substantially horizontally rearwardly from the upper end portion 36e of the front wall 36 so as to cover the area above and adjacent to the meter unit 26. This extension 38 has a rear end 38a which is, when viewed from lateral side, positioned rearwardly of the rear end 24a of the windshield 24.

As shown in FIG. 7, the shield bracket 48 is formed from a metal sheet by the use of any known bending process and includes a shield fitting portion 50, positioned above the outer covering segment 32, and a to-be-supported portion 52 positioned beneath the outer covering segment 32. The to-be-supported portion 52 is formed with a bolt insertion hole 52a that is oriented in the vertical direction.

The shield fitting portion 50 has a forwardly oriented fitting face 54. The fitting face 54 extends along the direction of inclination (diagonally rearwardly and upwardly) of the windshield 24, and a first slit 56 is formed in the fitting face 54. The first slit 56 referred to above is in the form of a throughhole having its direction of extension lying in a direction of extension of the fitting face 54. This first slit 56 extends in the vertical direction, when viewed from front as represented by FIG. 3.

In the next place, support structures for the windshield 24, the shield bracket 48 and the meter covering 28, all shown in FIG. 1, will be described in detail. The to-be-supported portion 52 of the shield bracket 48, which extends through the bracket opening 46, shown in FIG. 7, in the vertical direction is connected with a fitting metal piece 58, provided in an upper end of the cowl stay 45, with the use of a bolt 60 as shown in FIG. 8. Specifically, the bolt 60 is inserted into the bolt insertion hole 52a (shown in FIG. 7) in the to-be-supported portion 52, and is then threaded into a threaded hole (not shown) in the fitting metal piece 58 to thereby connect the shield bracket 45 with the cowl stay 45.

The meter covering 28 referred to previously is fitted to the front fairing 20 and the side fairing 25 by means of bolts 62 and 64 as shown in FIG. 2. Specifically, the bolt 62 is inserted into the bolt insertion hole 43 (shown in FIG. 4) in the inner covering segment 34 and is then threaded into a threaded hole (not shown) of the front fairing 20 and, at the same time, the bolt 64 is inserted into the bolt insertion hole 44 (shown in FIG. 4) in the inner covering segment 34 and is threaded into a threaded hole (not shown) in the side fairing 25. Thereby, the meter covering 28 is fitted to the front fairing 20 and the side fairing 25.

The windshield 24 shown in FIG. 3 is positioned upwardly of the front fairing 20 and is fitted to the shield bracket 48. A slide member 65 is interposed between the windshield 24 and the shield bracket 48. As shown in FIG. 7, the slide member 65 is in the form of a metal plate of a rectangular shape having its lengthwise direction lying in the direction of extension of the fitting face 54 of the shield bracket 48. The slide member 65 has opposite lengthwise ends which are bent rearwardly to provide respective guide pieces 67. The guide pieces 67 are guided along the first slit 56. Accordingly, the slide member 65 is so slidably set for movement along the shield bracket 48 in a direction substantially parallel to the lower half portion 36f of the front wall 36 so that the position of the slide member 65 relative to the shield bracket 48 can be properly fixed according to the size of the windshield 24.

Opposite lengthwise end portions of the slide member 65 are formed with respective insertion holes 65a into which corresponding tubular nuts 72 each having a threaded hole are inserted. A bolt 68 is inserted into the bolt insertion hole 40 (shown in FIG. 5) in the windshield 24 through a washer 71 and is then threadingly engaged in the threaded hole of the corresponding tubular nut 72. Accordingly, the windshield 24 and the slide member 65 are sandwiched together by the bolt 68 and the tubular nut 72. A second slit 66 is formed between the two insertion holes 65a and 65a in the slide member 65. This second slit 66 is in the form of a throughhole of a slot shape extending in the lengthwise direction of the slide member 65.

Also, an adjustment screw 69 is inserted sequentially into the opening 42 in the windshield 24, then into the second slit 66 in the slide member 65 shown in FIG. 7 and finally into the first slit 56 in the shield bracket 48, and is fastened by a fastening member 70 (shown in FIG. 4) such as, for example, a bolt, from a rear face of the shield bracket 48. Accordingly, the slide member 65 and the shield bracket 48 are fastened together between a female threaded portion 69a of the adjustment screw 69, shown in FIG. 2, and the fastening member 70 (shown in FIG. 4) to thereby allow the windshield 24 to be supported by the shield bracket 48. In other words, the windshield 24 is supported by the cowl stay 45 via the shield bracket 48.

The slide structure for the windshield 24 will now be described in detail. In order to allow the windshield 24 to be slid in the vertical direction, the adjustment screw 69 has to be first turned to become loose. By so doing, the slide member 65 and the windshield 24 connected therewith can be brought into a condition ready to slide along the first slit 56 (shown in FIG. 7) in the shield bracket 48. After the windshield 24 has been adjusted to a desired position, the slide member 65 and the shield bracket 48 are fastened and fixed by means of the adjustment screw 69 and the fastening member 70 (shown in FIG. 4).

Figure 9:
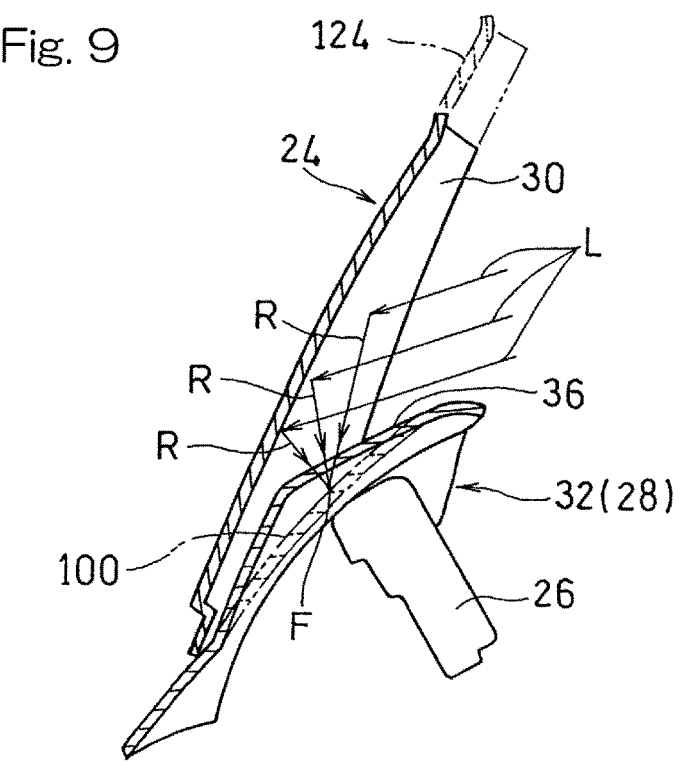
FIG. 9 is a longitudinal sectional view showing the front structure.

Referring to FIG. 9 which shows a longitudinal sectional view, in the shape of the conventional front wall 100, sunlight L from the rear is impinged upon and is then reflected from the rear surface 30 of the windshield 24. The light R so reflected is subsequently focused on a focal point F of the meter covering 28. If the condition in which the reflected light R is kept focused on the focal point F for a prolonged length of time which would occur during, for example, parking, there is the possibility that the meter covering 28 would be adversely affected.

Figure 10:
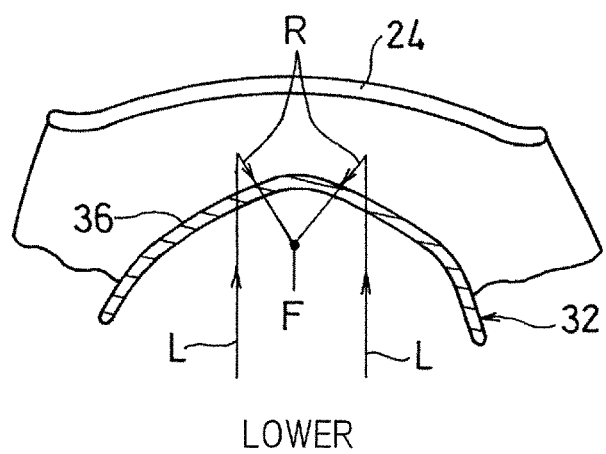
FIG. 10 is a rear view in which a portion showing the front structure is sectioned.

In contrast thereto, according to the construction hereinbefore described in connection with the present invention, the front wall 36 of the meter covering 28 is of the protruding shape bulged forwardly to allow the front wall 36 to deviate from the focal point F of the reflected light R from the windshield 24. Therefore, the reflected light R is never focused on one point of the meter covering 28, as shown in FIGS. 9 and 10. Accordingly, the adverse effect that the reflected light R from the windshield 24 would adversely affects the meter covering 28 can be suppressed.

Also, since the windshield 24 is provided for sliding movement in the vertical direction, the front wall 36 of the meter covering 28 is so designed and so shaped as to depart from the focus point F of the reflected right R from the windshield 24 regardless of the position of the windshield 24 (noting that the double dotted line 124 employed in FIG. 9 represents the highest position of the windshield). Accordingly, it is possible to suppress the adverse effect brought about by the reflected light R on the meter covering 28.

As shown in FIG. 2, the meter covering 28 includes the extension 38 extending from the upper end portion 36e (shown in FIG. 8) of the front wall 36 in the rearward direction so as to cover the area above and adjacent to the meter unit 26, and the rear end 38a of the extension 38 is, when viewed from lateral side, positioned rearwardly of the rear end 24a of the windshield 24. The extension 38 is preferably downwardly inclined, when viewed from lateral side, at an angle within the range of 20 to 50° relative to the neighborhood of the upper end portion 36e of the front wall 36, and in the practice of the preferred embodiment as set forth above the angle of inclination of the extension 38 is chosen to be about 35°. If the area above and adjacent to the meter unit 26 is covered by the extension 38 in the manner described above, the possibility that the sunlight may be reflected from the meter display surface of the meter unit 26 to form a ghost on the windshield 24 can be avoided. Also, formation of a ghost of light of the meter unit 26 during the night can also be avoided.

As shown in FIGS. 7 and 8, the front wall 36 is of the protruding shape having been bulged forwardly from the opposite end portions 36a and 36a towards the intermediate portion 36b while the lower half portion 36f extends along the rear surface 30 of the windshield 24 and, the upper half portion 36g extends having been inclined rearwardly so ad to depart from the windshield 24. Accordingly, owning to the upper end portion 36e of the meter covering 28, the possibility of the forward sight through the windshield 24 being disturbed can be avoided.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment of the present invention as hereinabove set forth, the meter covering 28 has been shown and described as covering the area forwardly of, lateral side of and above the meter unit 26, the present invention may be applied to such case that at least an area forwardly of and adjacent to the meter unit 26 is covered by the meter covering 28. Also, although in describing the preferred embodiment of the present invention as set forth hereinabove, the windshield 24 has been shown and described as being slidable manually, it may be performed automatically, for example, by means of a motor or the windshield 24 may be fixed in position.

Also, although in describing the preferred embodiment of the present invention the saddle-riding vehicle referred to hereinabove has been shown and described as the motorcycle, the present invention can be equally applied even when the saddle-riding vehicle is a three or four-wheeled, irregular ground travelling vehicle.

Accordingly, such changes and modifications are, unless they depart from the scope of the present invention as delivered from the claims annexed hereto, to be construed as included therein.

REFERENCE NUMERALS

20 . . . Front fairing
22 . . . Headlamp
24 . . . Windshield
25 . . . Side fairing
26 . . . Meter unit
28 . . . Meter covering 30 . . . Rear surface of the windshield
36 . . . Front wall of the meter covering
38 . . . Extension

What is claimed is:

1. A front structure for a saddle-riding vehicle, which comprises:
    a meter unit;
    a meter covering for covering at least an area forwardly of the meter unit; and
    a windshield disposed forwardly of the meter covering, wherein
    the windshield is disposed in a fashion inclined upwardly rearwardly when viewed from lateral side,
    the windshield has a rear surface bulged forwardly from opposite side portions thereof towards an intermediate portion thereof in a lateral direction while depicting a curved shape,
    the meter covering includes a front wall shaped to represent a forwardly bulged to thereby allow the sunlight, coming from rear, to divert from the focal point of light reflected upon the windshield, the front wall having a forwardly bulged protruding shape forwardly bulged from opposite side end portions towards a lateral intermediate portion in the lateral direction,
    the front wall includes: a lower half portion ranging from a lower end portion to a vertical intermediate portion in a vertical direction; and an upper half portion ranging from the vertical intermediate portion to an upper end portion,
    the lower half portion extends substantially parallel to a rear surface of the windshield in a direction diagonally upwardly and rearwardly at an angle of inclination α relative to a horizontal plane, whereas the upper half portion extends inclined diagonally upwardly and rearwardly at an angle of inclination β so as to diverge from the windshield, and
    the angle of inclination α is so set as to be within the range of 65° to 75°, and the angle of inclination β is so set as to be within the range of 25° to 35°.

2. The front structure for the saddle-riding vehicle as claimed in claim 1, in which the meter covering has an extension which extends from an upper end portion of the front wall in a direction rearwardly to thereby cover an area above the meter unit, and
    the extension, when viewed from lateral side, has a rear end that is positioned rearwardly of a rear end of the windshield.

3. The front structure for the saddle-riding vehicle as claimed in claim 1, in which the windshield is fitted for sliding movement in a vertical direction.

4. The front structure for the saddle-riding vehicle as claimed in claim 3, in which:
    the front wall of the meter covering includes a lower half portion ranging from at least a lower end portion to an intermediate portion in the vertical direction, the lower half portion extending substantially parallel to the windshield;
    the windshield is positioned upwardly of a front fairing having a headlamp mounted thereon, and is supported by a vehicle frame structure through a shield bracket that extends through the meter covering in the vertical direction; and
    the windshield is slidable substantially parallel to the lower half portion of the front wall along the shield bracket.

5. The front structure for the saddle-riding vehicle as claimed in claim 1, in which:
    the meter covering includes an outer covering segment and an inner covering segment, the outer covering segment and the inner covering segment being connected with each other; and
    the meter unit is mounted on the inner covering segment whereas the front wall is formed in the outer covering segment.

6. The front structure for the saddle-riding vehicle as claimed in claim 1, further comprising:
    a front fairing having the headlamp mounted thereon;
    a side fairing disposed on each lateral side of the front fairing to cover a region from at least an outer side of a head pipe and an outer side forwardly of an engine, wherein
    the meter covering is fitted to the front fairing and the side fairing.

7. A front structure for saddle-riding vehicle, which comprises:
    a meter unit;
    a meter covering for covering at least an area forwardly of the meter unit; and
    a windshield disposed forwardly of the meter covering, wherein
    the windshield is disposed in a fashion inclined upwardly rearwardly when viewed from lateral side,
    the windshield is fitted for sliding movement in a vertical direction,
    the windshield has a rear surface bulged forwardly from opposite side portions thereof towards an intermediate portion thereof in a lateral direction while depicting a curved shaped,
    the meter covering includes a front wall shaped to represent a forwardly bulged shape to thereby allow the sunlight, coming from a rear location, to divert from a focal point of light reflected upon the windshield,
    the front wall of the meter covering is so shaped as to depart from a focus point of the light reflected from the windshield, regardless of a position of the windshield, and
    the meter covering includes a lower right connection and a lower left connection extending below and being supported by a saddle-riding vehicle frame.

8. The front structure for the saddle-riding vehicle as claimed in claim 7, further comprising a pair of right and left shield brackets configured to slidably support the windshield, wherein
    a right bracket opening is defined in the meter covering between the front wall and the right connection, and a left bracket opening is defined in the meter covering between the front wall and the left connection, and
    the right and left shield brackets extend through the right and left bracket openings, respectively.

9. The front structure for the saddle-riding vehicle as claimed in claim 7, wherein the meter covering extends over the meter unit and away from the windshield and is bent to extend back toward the windshield to reduce any reflected sunlight from a rear surface of the windshield from contacting the meter unit.

\* \* \* \* \*